United States Patent [19]
Keppel

[11] 3,847,178
[45] Nov. 12, 1974

[54] FLUID FLOW REGULATORS

[75] Inventor: Wolf-Dieter Keppel, Remscheid, Germany

[73] Assignee: Mannesmann & Keppel Electronics, Remscheid, Germany

[22] Filed: Dec. 8, 1971

[21] Appl. No.: 205,842

[30] Foreign Application Priority Data
Dec. 10, 1970   Germany............................ 2060751
June 23, 1971   Germany............................ 2131117

[52] U.S. Cl............... 137/515.7, 137/517, 138/46, 251/DIG. 1
[51] Int. Cl........................ F16k 15/08, F16k 15/14
[58] Field of Search....... 137/515.7, 516.15, 516.17, 137/517; 138/43, 46; 251/DIG. 1

[56] References Cited
UNITED STATES PATENTS

| | | | |
|---|---|---|---|
| 2,781,061 | 2/1957 | Frey................................ | 137/517 X |
| 2,948,296 | 8/1960 | Thorburn........................... | 137/517 |
| 3,138,177 | 6/1964 | Cutler.................................... | 138/46 |
| 3,216,451 | 11/1965 | Smallpiece...................... | 137/517 X |
| 3,320,097 | 5/1967 | Sugalski...................... | 137/516.15 X |
| 3,406,715 | 10/1968 | Hruby, Jr..................... | 137/517 UX |
| 3,700,001 | 12/1972 | Rudel............................. | 137/515.7 |

FOREIGN PATENTS OR APPLICATIONS
1,316,693   12/1962   France................................ 137/517
804,705   11/1958   Great Britain...................... 137/517

Primary Examiner—Robert G. Nilson
Attorney, Agent, or Firm—Tab T. Thein

[57] ABSTRACT

Fluid flow regulators for intercalation in conduits through which flows a medium to be regulated, having a housing with interengaging inner and outer members, the inner member being in the form of an axial, profiled core portion, at least one housing member having intermittent flow passages therein, together with at least one seating surface, for an elastically deformable sealing member which constitutes flow throttling means. A bypass valve may be provided in an axial inlet passageway of the regulator. The sealing member is preferably annular but may have a different profile, such as rectangular, lip-shaped or other. The flow passages are radially or axially disposed, for respective axial or adial operation of the sealing member as a result of a pressure difference of the medium being regulated between the inlet and outlet sides.

9 Claims, 18 Drawing Figures

PATENTED NOV 12 1974　3,847,178
SHEET 2 OF 4

FLUID FLOW REGULATORS

The invention relates to fluid flow regulators in which passages are controlled by an elastically deformable ring, depending on the overpressure of the medium being controlled, which acts on said ring, thereby narrowing the passages. In known fluid flow regulators of this kind, which operate without auxiliary energy, it is not possible to design and dimension them for any desired range of quantities or to obtain rectilinear controlling courses over a substantial pressure range. Usually the ring is attached to or clamped onto a conical member which is displaceable and has to be adjusted against unavoidable frictional forces. Such regulators usually produce disturbing noises caused by the flowing medium, particularly in higher pressure ranges.

The present invention aims at eliminating these and other drawbacks of hitherto known structures, also providing various possibilities of application and adaptation by the provision of modified embodiments which will be fully described herein.

According to one of the important features of the invention, this object is attained by providing a profiled or specially shaped core for the elastic ring, said core having flow passages for regulating the medium allowed to pass therethrough.

The regulators can be so constructed that an elastic ring rests on another ring, having radially arranged undulations, the thus formed passages being narrowed or constricted depending upon the pressure difference prevailing before and after the undulating passages so that the medium flowing through the regulator is effectively controlled. The elastic ring is pressed into the undulating passages to a smaller or greater extent in accordance with the prevailing pressure of the medium, and the bottoms of the passages are preferably provided with support knobs which hold the elastic ring and extend to one-half to one-quarter the height of the total depth of the passages. The purpose of these knobs is to prevent excessive bending and concomitant constant deformation of the elastic ring when high inlet or differential pressures are encountered. Another purpose of the support knobs is to permit reliable regulation, on account of the special form given to the knobs, up to the highest pressure values.

The regulator housing is preferably injection molded or otherwise produced from a temperature-resistant thermoplastic material which has possibly low water retention; it is, however, also possible to make the housing from light or even heavy metals and other suitable materials.

The elastic ring consists of rubber, synthetic materials such as became known under the trade designation Perbunane, etc., of silicone or similar elastically deformable materials, and may be given various cross-sections, as will be explained later.

In regulators of the type described the medium passing through the conduits which include the regulator is kept constant over the prescribed or required connection pressure range as a result of the throttling or constriction of the flow passages, which is enhanced when the inlet pressure increases. In some of the embodiments to be described herein the elastic ring rests in its controlling condition on a flat surface which is perpendicular to the correlated core. Experiments carried out with such regulator embodiments have proven that the elastic ring moves toward and into the passages constituted by portions of the profiled or specially shaped core even with relatively low inlet pressures when the regulator runs itself into the normal or regulating condition.

As a result the running-in curve has a transition into the regulating curve that is much too flat, meaning that the required regulated medium flow is attained only with much too high inlet pressures. It has also been observed that the elastic ring cannot easily move back on the sealing or seating surface when perpendicularly disposed to the specially shaped core, when the inlet pressure drops.

It is therefore a further object of the invention to improve the basic regulator concept of the present invention so as to eliminate the just mentioned phenomena.

To this end, the sealing surfaces for the elastic ring are provided with a number of trough-shaped depressions or recesses, the number being preferably considerably high. This arrangement has as its result that the running-in curve is much steeper than without the recesses so that the optimum regulating flow is attained already at low pressure values. In preferred embodiments of the inventive device the sealing surfaces for the elastic ring are given a pitch or slope of about 10 to 15° in a direction toward the profiled core. This expedient allows the elastic ring much faster to return into its initial position when the inlet pressure drops.

Other objects and many of the attendant advantages of the invention will be readily appreciated as the same becomes better understood by reference to the following detailed description, when considered with the accompanying drawings, wherein

FIG. 8 is a vertical sectional view of still another embodiment of the regulators according to this invention, with a ring operative again in radially inward direction, and featuring an outwardly sloping sealing surface therefor, corresponding to a section 8 — 8 in the subsequent FIG. 9a;

Figure 1A:
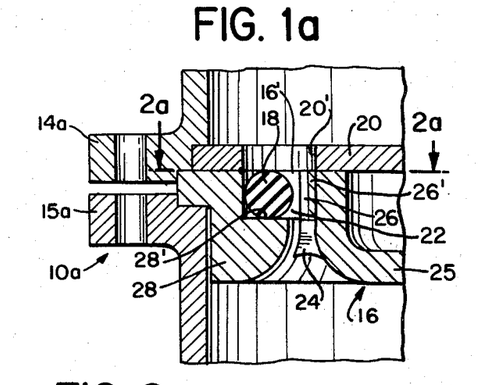
FIGS. 1a and 1b are respective partial vertical sectional views of a first embodiment of the inventive fluid flow regulators, with different coupling arrangements between adjoining conduit sections in which the regulator is intercalated, in both instances with an elastic ring operating in a radially inward direction.
Figure 1B:
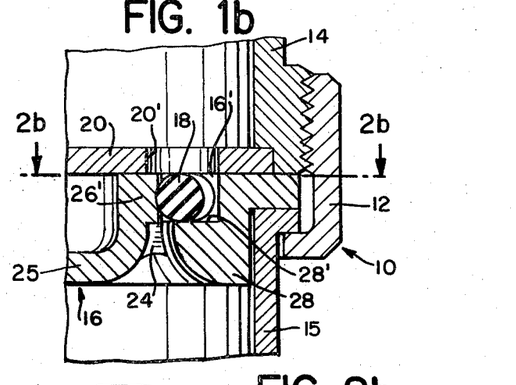

FIGS. 1a and 1b both show a first embodiment of the inventive fluid flow regulator, in respective left- and right-hand partial vertical sectional views, with respective horizontal sections constituted by FIGS. 2a and 2b, the difference being in the coupling arrangement between adjoining conduit sections in which the regulator is intercalated, as will be explained.

An inner housing member 16, including a core portion 25, and an outer housing member 28 are constructed so as to accommodate an elastically deformable, preferably annular sealing member 18, disposed in a recess 16' between the housing members, and resting on a seating surface 28'.

A cover plate (sometimes made in the shape of a cross) designated by numeral 20 closes the housing toward the inlet side of the regulator and has apertures or openings 20' therein for admission of the medium to be regulated, in the direction toward recess 16'.

Figures 2A, 2B:
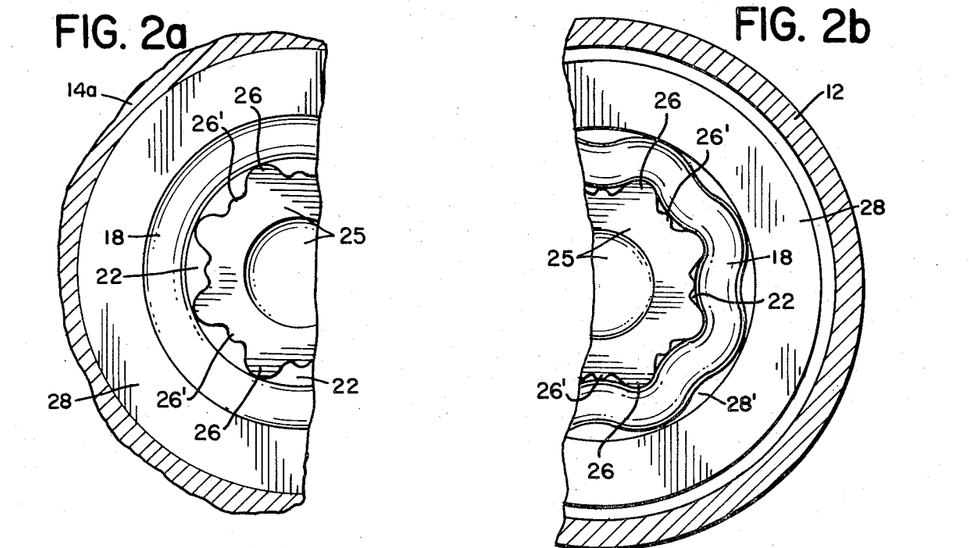
FIGS. 2a and 2b are respective horizontal sectional illustrations taken in FIGS. 1a and 1b, respectively, along the lines 2a and 2b, noting that the elastic ring is in its rest position in FIGS. 1a and 2a, and partially stressed in FIGS. 1b and 2b.

As can be best seen from FIGS. 2a and 2b, core portion 25 of the housing has alternating peripheral protuberances, preferably in the form of undulations 26, 26, as shown, facing outwardly, that is toward the inner wall of sealing member 18, thus forming respective intermittent flow passages 22. In FIG. 2a sealing member 18 is shown in its rest position while in 2b it is shown in operation, partly stressed or forced by the fluid inwardly, toward core member 25.

Members 25, 28 are interconnected by spaced-apart lower ribs 24 which may be given various shapes, as will be seen in the other illustrations.

The conduit portions into which the regulator is intercalated preferably include the earlier-mentioned coupling of which a preferred embodiment appears in FIGS. 1b and 2b (also in the exploded view of FIG. 7, corresponding to the first inventive embodiment), and in another embodiment which will be described in connection with FIG. 4. Numeral 10 generally designates this coupling, including a conventional cap screw 12 adapted to interengage conduit or housing sections 14, 15.

Figure 3:
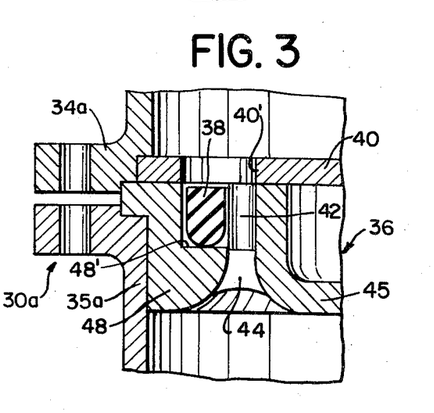
FIG. 3 is a partial vertical section through a modification, otherwise similar to FIG. 1a, having a specially shaped elastic member or ring therein, and operating again in a radially inward direction.

A modification is shown in FIGS. 1a, 2a and 3, including a coupling 10a with conventional fastening means (such as a bolt or the like, not shown) to be passed through axial, aligned bores of conduit or housing sections 14a, 15a, as will be readily understood by those skilled in the art.

Figure 8:
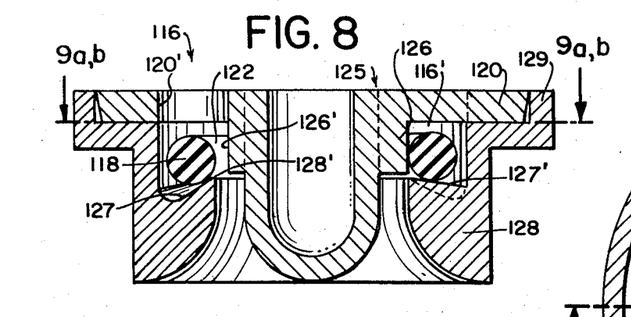
Figure 9A:
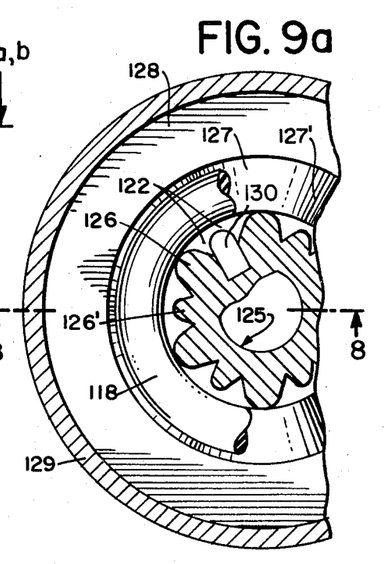
FIGS. 9a and 9b are both horizontal sectional views taken in FIG. 8 along the lines 9a, 9b, respectively, the ring being in its rest position in FIG. 9a and partly stressed in FIG. 9b.
Figure 10:
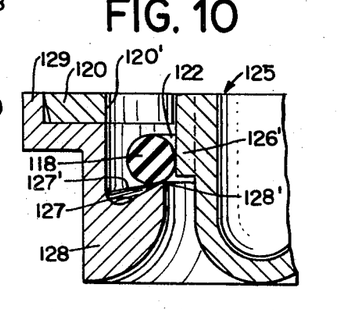
FIG. 10 is the same embodiment as FIG. 8, in a partial sectional view, but with the ring partly stressed, as in FIG. 9b, and taken along the line 10 — 10 of the latter.

The couplings have been shown only for a few of the figures while, it should be understood, all the remaining embodiments, such as those shown in FIGS. 8, 10, etc., through 15, can have one or the other, or even a different, conventional, coupling associated therewith although not specifically illustrated. All embodiments are compatible with the two exemplary couplings, even the preferred flange form for the outer housing member as will be shown and described for FIGS. 8 and 9a, etc.

Sealing member 18 may be a rubber ring, or made from a synthetic material and the like, adapted to provide sealing action while being readily deformable as a result of the fluid flow. It may have an annular cross-section, may be rectangular, quadratic, and may have its wall facing the seating surface rounded (see FIG. 3 to be described hereunder). Special profiles are also compatible, such as will be shown in FIG. 12.

It will be readily seen that sealing member 18 rests in the described first embodiment on the substantially horizontal seating surface 28', operating as it does in radial direction, inwardly, toward core portion 25 with protuberances 26, 26' thereon.

The operation of the inventive regulator can easily be understood when comparing FIGS. 2a and 2b, the former allowing maximum fluid throughput, such as with low pressure differences between the intake and output sides of the regulator, while gradually throttling the flow with increasing intake pressures, as shown in the latter where member 18 partly obstructs flow passages 22.

FIG. 3 is a partial section through a modified regulator, otherwise similar to FIG. 1a, wherein identical or similar parts are designated by corresponding numerals taken from a higher numerical group (such as 30 to 49, as against numerals 10 to 29 of the first embodiment). A similar arrangement is being used for the additional embodiments and modifications to be described hereafter.

It will be clear that parts 30a, 34a, 35a, 36, 38, 40, 40', 42, 44, 45, 48 and 48' are the counterparts of the previously described elements of FIGS. 1a and 2a, namely 10a, 14a, 15a, 16, 18, 20, 20', 22, 24, 25, 28 and 28', in this order. The only modification is actually in the shape of sealing member 38 which is not circular in cross-section as is member 18 but is flattened or oblong, and rounded at its bottom where it rests on surface 48'. Ribs 44 are somewhat wider, between core portion 45 and outer housing member 48, than in the previous embodiment.

Figure 4:
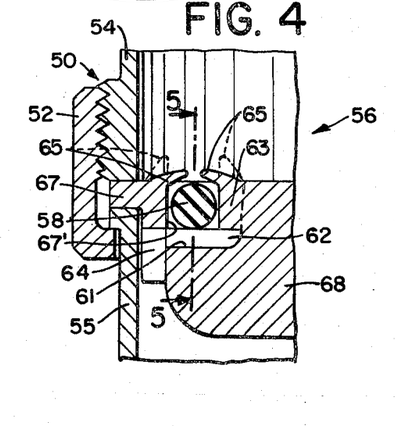
FIG. 4 is a partial vertical section through another embodiment, otherwise similar to FIG. 1b as to its coupling arrangement, with a ring operating in axial direction.

FIG. 4 constitutes yet another embodiment, being differently constructed in that the sealing member is made to operate in an axial direction, rather than radially, as in the preceding embodiments. This illustration has some similarity in its attachment with FIGS. 1b and 2b, and this is where elements 50, 52, 54 and 55 have their counterparts in the already described elements 10, 12, 14 and 15, constituting a possible coupling arrangement for the regulator.

An inner housing member 56 has a lower portion 68, taking the role of the previously described core portions, with an annular sealing member 58 adapted to rest on ridges of an annular portion 61, on top of portion 68, having a vertically undulating profile (see FIG. 5) similar to the horizontal ondulations in previous core members 25, 45.

Sealing member 58 cooperates with seating surface 67' of an outer housing portion 67, ribs 64 being provided for interconnecting housing portions 67 and 68, but allowing fluid flow in a substantially axial direction. In this embodiment, flow passages 62 are horizontal, between undulations or ridges 66, 66' (see FIG. 5) on the outer top surface of lower housing portion 68. Supporting ribs 63 extend in the upper region of portion 68, and on top of these ribs 63 and of the earlier-mentioned housing portion 67, locking or retaining flaps 65 are provided to retain sealing member 58.

For the sake of clarity, a cover member has been omitted from FIG. 4 although, it should be understood, it is entirely compatible with this embodiment.

Figures 5, 6, 7:
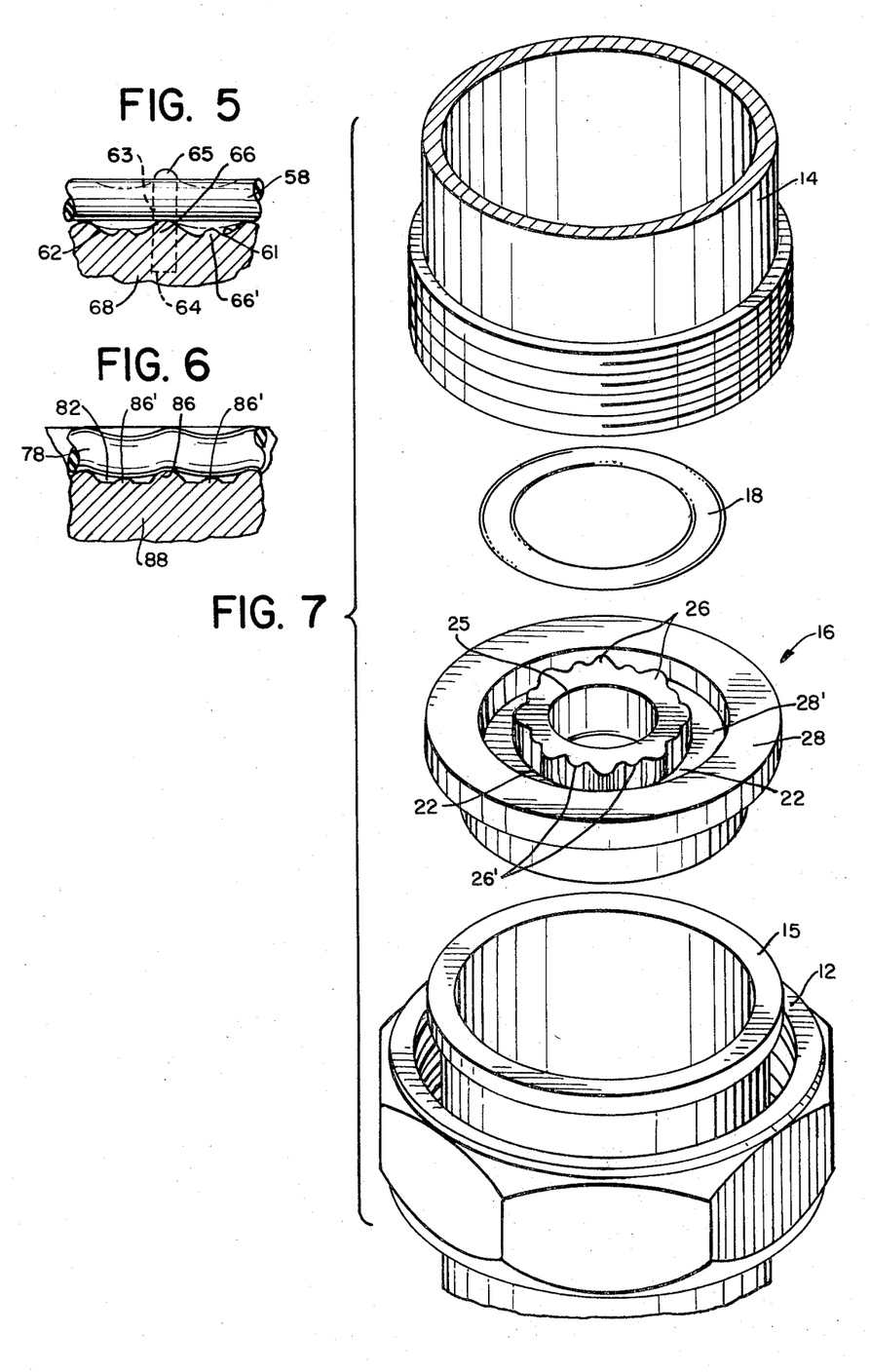
FIG. 5 is a developed, vertical sectional view of a portion of FIG. 4, along the line 5 — 5.
FIG. 6 shows a partial modification of a detail of the first or third embodiments (FIGS. 1a, 1b or 4)
FIG. 7 is an exploded, somewhat simplified view of the regulator shown in FIGS. 1b and 2b.

FIG. 5 is a vertical sectional view of a portion of FIG. 4, seen toward the axis of the regulator, wherein annular portion 61 and passages 62 are visible below member 58, ribs 63 are behind it, and one of the flaps protrudes from behind said sealing member 58. The respective larger and smaller, alternating protuberances or ridges 66, 66' face upwardly. Fluid flow is vertically downward, between flaps 65, then radially outward through passages 62 between protuberances 66, 66' (see again FIG. 4), and thence downward again, between and along ribs 64.

FIG. 6 is again a partial modification, compatible with the earlier embodiments, showing a sealing member or ring 78 in partly stressed condition, urged by the passing fluid against smaller support knobs or ridges 86' provided on lower housing portion 88, intermediate larger ridges 86, thus producing a plurality of flow passages 82 therebetween.

Such ridges 86' are also provided also in core members 25, 45 of the earlier-discussed embodiments, and/or in portion 68, whereever an undulating seating surface is provided for the respective sealing member. It will be understood that the respective larger and smaller protuberances, undulations or ridges 26 and 26', 66 and 66' are similar to the just described counterparts 86, 86'.

The description will now deal with the remaining embodiments which have the additional, common feature that the seating surfaces for the sealing members have a number of trough-shaped depressions or recesses, preferably with a slope of from 10° to 15° in a direction toward the profiled core.

Basic structural expedients are otherwise similar, and for this reason certain elements, such as couplings, boltor cap-type fastening means, etc. have been omitted from the illustrations.

One embodiment of this particular kind is shown in FIG. 8 in the rest position of the sealing member while the partial view of FIG. 10 shows the same during operation, under pressure applied by the fluid flow, so that the member is urged toward the core member, as will be explained. The two vertical sectional views have corresponding horizontal sections illustrated in FIGS. 9a and 9b, respectively.

This embodiment also has inner and outer housing members, numbered 116 and 128 respectively, the former including a core portion 125 constructed again to accommodate an annular sealing member 118. The latter is disposed in a recess 116' between the housing members and rests on a seating edge or surface 128' of member 128.

Figure 9B:
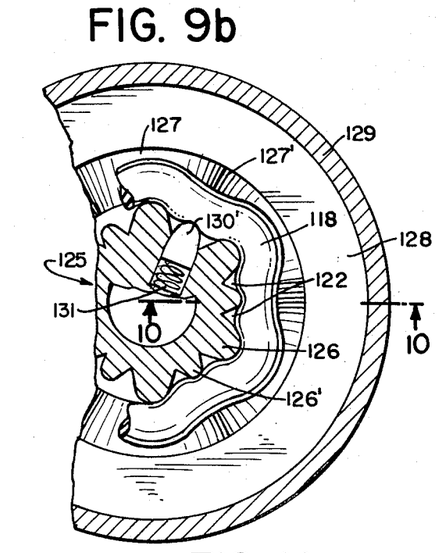

Here again a cover plate 120 is provided on the end of the housing toward the inlet of the conduit, with apertures or openings 120' for admission of the medium to be regulated. Flow passages 122 between sealing member 118 and core portion 125 are similar to those described before, as can best be visualized in FIG. 9a. The respective protuberances of core portion 125 are identified by numerals 126, 126'. FIGS. 9a, 9b show these portions in a manner similar to the earlier-described and illustrated ones, such as 26, 26', etc.

The earlier-mentioned trough-shaped depressions or recesses are shown at 127, preferably with a slope of about 10° to 15°, in this instance sloping downwardly and away from core portion 125 and having seating surfaces 127' thereon (see FIG. 9a).

In this embodiment, as well as in the following ones, outer housing member 128 is shown with a peripheral flange 129 which allows fluid-tight mating engagement with cover plate 120, within any one of the already described couplings (such as 10, 10a or others) for intercalating the regulators in a fluid conduit. It should be noted that the overall thickness of the cover plate and the associated flange does not exceed that of a conventional sealing or packing ring, thus allowing the regulators to be installed into existing conduits and pipe couplings without making any changes therein, such as by simply substituting the same for the previously used packing rings.

As mentioned before, FIGS. 9b and 10 show the same structure as just discussed only with sealing member 118 urged into throttling position, against ridges 126, 126' of the regulator structure, as a result of an increased intake pressure.

Figure 11:
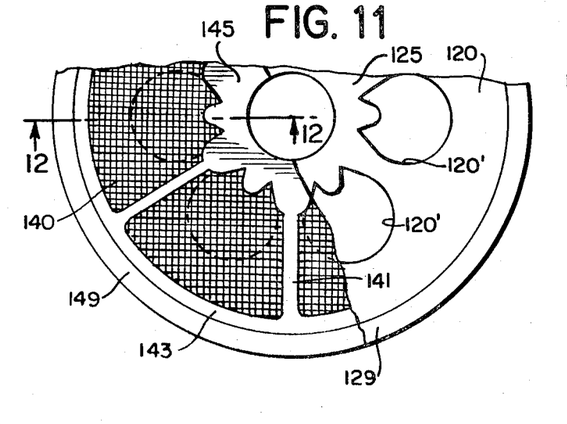
FIG. 11 is a partial top view of the embodiment shown in FIG. 8, also illustrating in its left-hand portion optional filtering elements.
Figure 12:
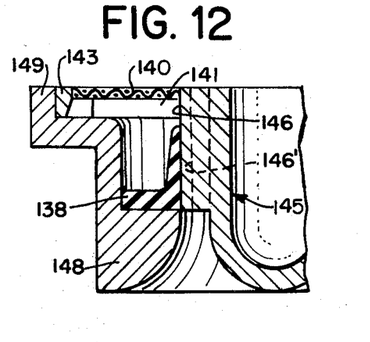
FIG. 12 is a partial vertical sectional view, somewhat similar to FIG. 10, but of a modification with an elastic-lip sealing member for low pressures, also with radially inward operation, and showing the before-mentioned filtering elements.

FIG. 11 is a partial top view of the just described embodiment but showing in its left-hand portion alternative filter means which can be substituted for cover plate 120, as shown in the vertical sectional view of FIG. 12. The filter is in the form of a plate 140 being preferably supported and reinforced by ribs 141, and/or a ring portion 143, as shown. Ribs 141 connect portion 143 to a central member 145.

While the latter, core portion 146, ridges 146', outer housing member 148 and flange 149 thereof are substantially identical with the previously described counterparts of FIGS. 8 and 10, FIG. 12 shows the modification of an elastic, lip-shaped sealing member 138 which is different from the previously shown annular member 18, 58, etc. and the oblong, rounded-bottom member 38. It will be seen that member 138 rests on a top surface of housing member 148 while touching the radially extending ridges 146' of core portion 146, particularly when the medium passing through filter plate 140 acts thereon before continuing its path, in a downward direction, in FIG. 12.

No ribs are shown (such as 24 in FIGS. 1a, 1b) but they could of course be provided between respective pairs of central members 125, 145 and housing members 128, 148, respectively. It will be understood that ring 143 of filter plate 140 rests in flange 149 or in any other flange such as 129 of the previous regulator embodiment, including those to be described hereinafter for FIGS. 14 and 15.

It should be noted that the structure of FIG. 12 and particularly the lip shape of sealing member 138 is well suited for very low operating pressures. Other considerations of operation will be given somewhat later.

Figure 13:
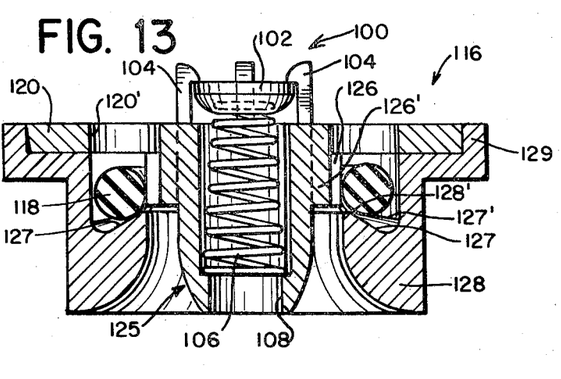
FIG. 13 is the same embodiment as FIG. 8 but having an inlet valve inserted in the regulator core.

FIG. 13 is the same embodiment as FIGS. 8 and 10 but with the difference that central core member 125 has an axial passageway into which is inserted a bypass inlet valve generally designated by numeral 100, having a valve cone 102 which is guided between elastic, hook-shaped members 104 and is biased in an upward direction, into its open state, as shown, by a spring 106. The inner end of the passageway is identified by numeral 108. The protuberances 126, 126' of this embodiment have already been described in connection with FIGS. 8 to 10.

It will be understood upon inspection of the illustration that the valve allows the fluid to bypass the regulator, namely the throttling member constituted by the deformable ring 118 (or any equivalent member such as 138, etc.) as long as the intake pressure is low. With increasing pressure, cone 102 would gradually be forced to close, disabling the bypass and allowing the regulator to take full effect. This arrangement eliminates any irregularities in the transition from the running-in curve to the regulating curve in full operation.

It should also be understood that the bypass valve arrangement shown in FIG. 13 is compatible with and can be used in all embodiments, such as those of FIGS. 1a, 1b, 3, 4 etc., as long as a passageway can be provided for the bypass valve, such as axially within the inner housing or core portion thereof. All other parts and numeral designations of FIG. 13 have already been explained in connection with the preceding FIGS. 8 through 10.

Reverting for a moment to the earlier description, it should be reminded that the embodiments of FIGS. 1 through 3 relate to structures in which the elastic member or ring operates in a radially inward direction. The same operating principle appears in FIGS. 8, 10 and 13, as well as in the modification of FIG. 12. The structure of FIGS. 4 to 6, on the other hand, has a sealing member or ring operating in an axial direction, in the same sense as the fluid flow through the regulator; a similar principle is used in the embodiment of FIG. 14 to be described hereinafter, while finally FIG. 15 again has a radially operating sealing member but this time acting in outward direction, away from the core, namely toward protuberances or ridges in the outer housing member, as will be explained.

Figure 14:
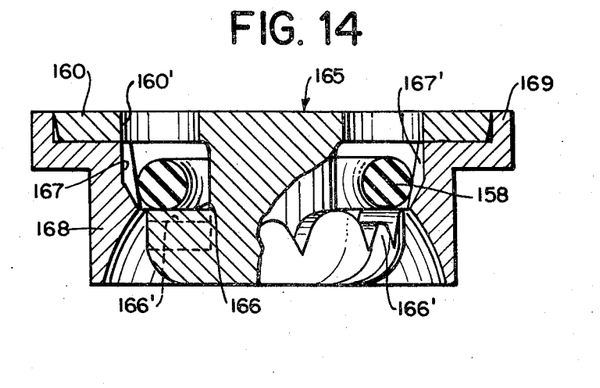
FIG. 14 is a vertical sectional view of a further regulator embodiment, similar to those of FIGS. 8 and 13 but with an axially operating sealing ring.

In FIG. 14 a ring 158 is adapted to engage a profiled core portion 165 having undulations or protuberances 166, 166' thereon. A cover plate 160 with apertures 160' sealingly engages flanges 169 of an outer housing member 168. In contradistinction to the previously described structures, outer member 168 has therein seating surfaces 167' with a plurality of depressions or recesses 167 which cooperate with sealing member 158. Except for the direction of flow, somewhat similar to that described for FIG. 4, this embodiment operates just like the others.

Figure 15:
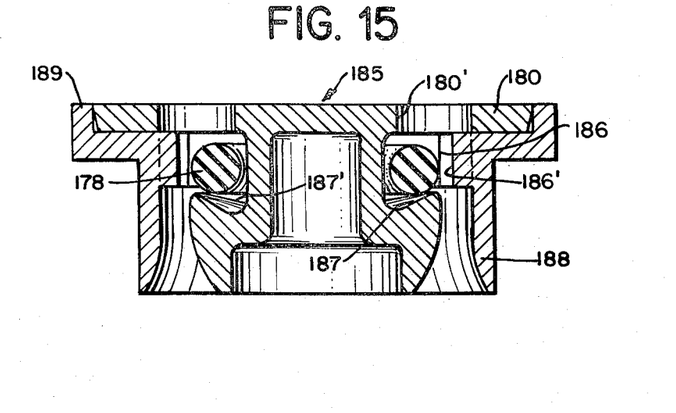
FIG. 15 is yet a further embodiment, with an elastic ring that operates outwardly, in radial direction.

Finally, yet a further embodiment is shown in FIG. 15, having similar structural elements but a seating surface 187' with recesses 187 disposed this time in a core or central member 185, with an inwardly sloping configuration (those of FIGS. 8, 10 and 13 were all sloping outwardly). Instead of centrally disposed protuberances, an outer housing member 188 has inwardly projecting undulations or ridges 186, 186' in its inner wall, which perform in the described manner, in cooperation with a sealing member 178. The remaining parts identified by numerals 180, 180', 185 and 189 are substantially identical with the earlier-described elements, such as 120, 120', etc.

Those skilled in the art will appreciate that FIGS. 14 and 15 can also be provided with the bypass valve of FIG. 13, such as in their respective central core members 165 and 185.

As to operational features not touched upon in the preceding portions of the description, it should be stated that the regulator according to the invention allows output pressures to be kept substantially constant, despite fluctuations of load and/or intake pressure. This is due to the action of the sealing members or deformable rings, in cooperation with the flow passages formed between the rings and the ondulating or profiled portions of the respective housing or core members.

With very high pressures, when the sealing member rests on the smaller undulations or on appropriate support members (such as 26', 86', 126', 166', and 186', shown in the respective FIGS. 1a, 1b; 2a, 2b; 4; 8; 9a, 9b; 10 and 13 to 15), the free bending or stretching distance of the sealing member is reduced to about its half so that very good regulating characteristics result up to the highest input pressures.

The support members mentioned in connection with FIG. 6 can be substituted, according to the invention, by elastically deformable pins 130, as shown in FIG. 9a, made for example of rubber or other deformable material (e.g. Perbunane, silicone and the like), or of metal, which can alternatively rest on springs 131, preferably helical compression springs, as illustrated in FIG. 9b. In the latter arrangement, pins 130' are biased toward the engaging sealing members 118, allowing adjustment of the regulating characteristics by providing springs of an appropriate biasing force.

It should be noted that in the embodiments of FIGS. 8 through 15, the trough-shaped recesses allow a certain amount of fluid to flow past the sealing members as long as they are not substantially stressed into engagement with the adjoining seating surfaces, throughout their contacting areas. In a way, the arrangement of the preferably sloping trough-shaped recesses constitutes a kind of bypass for the fluid, such as was shown in a different arrangement with the valve of FIG. 13. Expressed in other terms, initially the sealing members do not act in a throttling manner since the differential pressure necessary for their distortion cannot build up as long as relatively small amounts of fluid are allowed to bypass the sealing members or rings through the intermediary of the recesses.

When the inlet pressure increases, such as from about 1.5 atm. overpressure up, the sealing members are made to hug the recesses to an extent that the sealing action is almost complete, whereby the diferential pressure required for the regulation is fully attained. This is when the rings assume the positions shown in FIGS. 9b and 10.

If a regulating effect below the indicated pressure values is required, it is recommended to use the lip-shaped sealing member shown in FIG. 12. yet further reduction in the pressure range can be achieved by the use of the bypass valve of FIG. 13. The amount of fluid entering through the axial passageway is additional to the bypass achieved by way of the trough-shaped recesses. The spring and valve-cone guide system shown in FIG. 13 allow precise adjustment of the limit value at which the regulator starts its controlling function, without any fluid allowed to be bypassed.

The axially operating sealing member of FIG. 14 has a slightly different operating range since gravity does not enter to the same extent intothe regulating action.

The overall running-in pressure range lies approximately between 1.5 and 2 atm. overpressure.

It should be understood, of course, that the foregoing disclosure relates only to preferred embodiments of the invention, and that it is intended to cover all changes and modifications of the examples described which do not constitute departures from the spirit and scope of the invention.

What I claim is:

1. A fluid flow regulator adapted for operative intercalation in a conduit through which flows a medium to be regulated, comprising, in combination: a housing including interengaging inner and outer housing members; said inner member being in the form of a substantially axial core portion; a plurality of intermittent larger and smaller protuberances on said core portion; an elastically deformable sealing member, having a substantially circular cross-section, surrounding said protuberances and constituting flow throttling means in cooperation with said protuberances and also with a seating surface provided on saidouterhousingmember; said sealing member being variably inwardly pressed against said protuberances during the flow of the medium; said core portion having intermittent fluid flow passages between said protuberances and said sealing member; and means for changing the cross-section of said passages and the contact areas in the direction of flow of the medium between said sealing member, on the one hand, and said protuberances and said seating surface, on the other hand, depending on increasing and decreasing differential-pressure values of the medium flow through the regulator, whereby substantially linear contact is made by the outside of said sealing member with said seating surface in the outer housing member, while substantially punctiform contact results by the inside of said sealing member where the latter faces said larger protuberances of the inner housing member, but practically no contact by said inside of the sealing member where it faces said smaller protuberances in the absence of the medium flow.

2. A fluid flow regulator adapted for operative intercalation in a conduit through which flows a medium to be regulated, comprising, in combination, a coupling in said conduit, a housing including interengaging inner and outer housing members and portions adapted to be held between portions of said coupling, said inner housing member being in the form of a substantially axial, profiled core portion, an elastically deformable sealing member which constitutes flow throttling means in the regulator in cooperation with at least one seating surface provided on one of said housing members, said seating surface including a plurality of protuberances against which said sealing member is variably pressed during the flow of the medium, at least one of said housing members having intermittent fluid flow passages therein between said protuberances and said sealing member, and means for changing the cross-section of said passages, depending on increasing and decreasing differential-pressure values of the medium through the regulator, whereby the amount of the medium is kept practically constant, wherein said protuberances are constituted by portions of said last-named one housing member that constitute main fluid throttling portions between which are disposed lower auxiliary throttling portions, said throttling portions cooperating with said flow throttling means, the widths of said throttling portions determining the amount of the medium to be allowed to pass through the regulator, while their heights make for keeping the amount constant in a higher range of approximately 3 atmospheres overpressure.

3. The fluid flow regulator as defined in claim 2, wherein said coupling portions have respective inner and outer threads, and said coupling includes a cap screw for sealingly interengaging said housing portions.

4. The fluid flow regulator as defined in claim 2, further comprising a removable cover plate for said housing, with apertures therein allowing admission of the medium to be regulated.

5. The fluid flow regulator as defined in claim 4, wherein one of said housing members has peripheral flange means in sealing engagement with the outer perimeter of said cover plate.

6. The fluid flow regulator as defined in claim 2, wherein said protuberances are constituted between undulating wall portions of said core portion.

7. The fluid flow regulator as defined in claim 2, wherein said sealing member has other than a circular cross-section.

8. The fluid flow regulator as defined in claim 7, wherein said sealing member is rounded on one side which is adapted to touch said seating surface.

9. The fluid flow regulator as defined in claim 1, wherein said passages are substantially axial with respect to said housing, and said sealing member surrounds said core portion.

* * * * *

UNITED STATES PATENT OFFICE
CERTIFICATE OF CORRECTION

Patent No. 3,847,178                    Dated November 12, 1974

Inventor(s)   Wolf-Dieter Keppel

It is certified that error appears in the above-identified patent and that said Letters Patent are hereby corrected as shown below:

Column 9, line 21 (claim 1, line 12), change to read -- seating surface provided on said outer housing mem- --; and column 10, line 46 (claim 9, line 1), change "1" to -- 2 --; and in the Abstract, third line from the end, change "adial" to -- radial --.

Signed and sealed this 7th day of January 1975.

(SEAL)
Attest:

McCOY M. GIBSON JR.
Attesting Officer

C. MARSHALL DANN
Commissioner of Patents